Patented Aug. 18, 1931

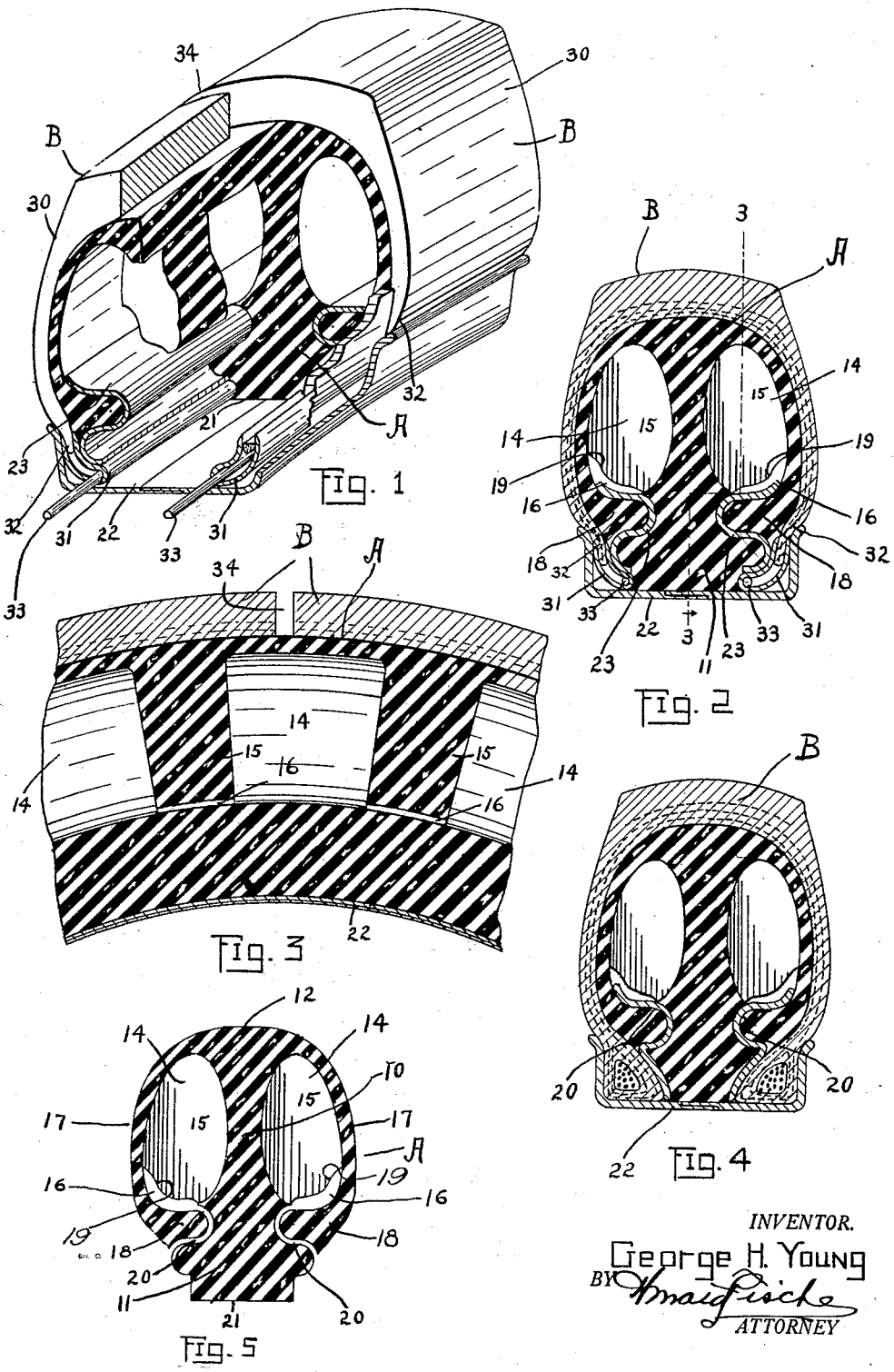

1,819,632

UNITED STATES PATENT OFFICE

GEORGE H. YOUNG, OF CHICAGO, ILLINOIS

TIRE CUSHION

Application filed April 25, 1925, Serial No. 25,749. Renewed July 3, 1931.

My invention relates to improvements in tire cushions for automobile tires where it is desired to provide a cushion which can be readily placed within the ordinary casing and which does not require any air for inflation to give the necessary resiliency that is desired in tires.

A feature of the invention resides in a cushion made up of resilient material such as rubber, of a sponge-like nature, or any other suitable substance having the desired resiliency and wherein compartments are formed in the cushion, which are so arranged as to provide a cushion of a very flexible nature, yet having the rigidity to fill out the casing and hold the same in a manner to carry the load of the vehicle to which the tire and cushion are attached.

The invention also includes means for circumferentially engaging the lower portion of the cushion in a manner so as to increase the rigidity at the base of the cushion where it connects with the casing adjacent the beads of the casing and where it rests upon the rim which holds the casing about the cushion. This means of stiffening the cushion is in the form of ring-like members of a shape so as to be firmly locked into the sides of the cushion so that when the cushion is pressed into the casing, when it is secured to the supporting rim, the ring-like members are held firmly in place and are prevented from creeping in the cushion.

A further object of my invention is to provide a cushion which is formed with angular slits in the same formation as the ring-like stiffening ribs or members so that the ring-like members will fit in the slits formed in the cushion.

The invention also includes a cushion which can be used inside a series of casing members which are formed from the regular ordinary shaped casing, but instead of extending in one piece about the cushion are formed of sections which are positioned adjacent each other, spaced slightly apart, but so as to cover the major portion of the cushion. This protects the cushion within the sections of casing and provides a recess between each section which forms a gripping means so as to provide a tire having means for overcoming skidding or slipping. My reinforcing means within the lower portion of the tire permits these sections to be readily used, otherwise it would be difficult to use sections on a cushion of this nature.

All of the features and other objects of my invention will be more clearly set forth in the following specification and claims.

In the drawings forming part of my specification:

Figure 1 is a perspective sectional view of a portion of my cushion, illustrating the casing for covering the same, made up in sections.

Figure 2 is a cross section through the casing, cushion and supporting rim for the tire.

Figure 3 is a section on the line 3—3 of Figure 2.

Figure 4 is a section similar to Figure 2, excepting in this section the ordinary casing is used to cover the cushion with the ordinary side beads which are engaged by the supporting rim.

Figure 5 is a cross section of the cushion as it would appear when outside of the casing, and with the stiffening rings removed from the same.

In the drawings my tire cushion A is formed of rubber, of a sponge-like nature, or any other suitable resilient material, so as to provide the necessary flexing for the casing and cushion to the wheel, so as to absorb the shocks and road jars to make the vehicle ride easily.

The cushion A is formed of an outer cross sectional shape of practically the same general outline as the inside of an ordinary automobile tire casing. The body of the cushion A is formed with a central rib member 10 which extends from the base 11 centrally to the upper part 12 so as to form an annular rib or reinforcing portion 10 extending around the tire cushion. The cushion A is made of a circular nature all in one piece.

The cushion A is formed with openings 14 on either side of the reinforcing rib 10 and these openings are spaced apart by the webs 15 so that the cushion A is made up with a series of open portions such as 14 about the entire cushion.

The web portions 15 are of a suitable width as illustrated in the cross section in Figure 3 and are formed integral with the body of the cushion. The webs 15 are cut away at 16 along the bottom portion so that the webs extend from the side walls 17 and the central rib portion 10 toward the bottom. The cut away portions at 16 provide a space between the lower edge of the webs 15 and the tongues 18 formed on the lower edge of the walls 17. This space 16 provides a means of permitting the cushion A to be depressed when receiving a shock in use, and relieves the rigidity of the cushion by reason of the reinforcing and supporting webs 15. If the shock of the bump is of considerable force or the load carried by the cushion is of a considerable proportion then the cushion A will collapse enough so that the lower edges 19 of the webs 15 will come in contact with the tongues 18, by reason of practically closing the opening 16 between the tongues 18 and the edge 19 of the webs 15. This is an important feature of my invention as it provides means for permitting the tire cushion A to readily flex under ordinary conditions, yet when the strain or load on the tire is increased the cushion settles down on to the edges 19 of the webs 15 and carries the load without weakening the cushion and in a very desirable manner.

My cushion A is formed with annular slits 20 which extend from the outside of the cushion adjacent the sides of the base 11 and into the openings 16. These slits 20 are of an S-like shape in the cushion section illustrated in Figures 2 and 5 and can be of any other suitable shape as illustrated in the cross section in Figure 4. It is preferred, however, that these slits be not straight but curved or angular in shape.

The base portion 11 of my cushion A is formed with a lower rim bearing surface 21 which engages against the bottom of the rim 22 to form a flat, broad surface against which the cushion can rest upon the rim 22 and directly in line with the central rib portion 10.

I prefer to provide my cushion A with a pair of stiffening rings such as 23 which are formed of metal or any other suitable substance harder than pliable rubber and which have a cross sectional shape similar to the shape of the slits 20 formed in the cushion A. These rings 23 fit in the slits 20 and are positioned within the same just before the cushion is inserted in the casing B of the tire. After these rings 23 are placed in the cushion and the same is within the casing the casing is attached to the supporting rim 22 by pressing the same into position, the cushion being pliable enough at the base to permit the same to be readily attached to the rim. The tongues or flaps 18 formed by the slits 20 in the cushion A permit the same to be pulled away from and held extending from the base so that the ring reinforcing members 23 can be placed within the slits 20 against the sides of the base 11.

When the cushion is assembled within the casing B the reinforcing rings 23 form a means of providing a rigidity to the base 11 of the cushion so as to prevent the free flexing at the base and stiffen the same to take care of any side thrust on the cushion when it is in use.

It is also an important feature of my invention that the slits 20 permit the forms which mould the openings 14 in the cushion A to be easily used. After the cushions are moulded it is necessary to remove the cores within the openings 14 and this is readily accomplished by lifting up the flaps or tongues 18 and pulling the rings, which are similar to the rings 23, and on which the core members of a shape similar to the openings 14 are attached so that the cushion A can be readily made with ordinary well known equipment. This is an essential feature in providing a practical cushion. In use my cushion is very adaptable in ordinary casings as illustrated in Figure 4, however, it is just as practical to use casing sections 30 which are made up from ordinary casings by cutting the same in sectional parts and which can be provided with loops 31 formed of metal or other suitable material which are firmly secured to the lower edges 32 of the side walls of the casing sections 30. Wire ring members 33 can be passed through the loops 31, as illustrated in Figures 1 and 2, to provide an edge which extends under the lower edge of the supporting rings 23 and thus clamp the edges of the sections of the casing firmly to the cushion and the rim. It is evident, however, that ordinary, old casings can be taken and cut into sections, using the best portions and thus make up the sectional members 30 for the casing to be used over my cushion A. This form of sectional casing members for my cushion A is practical and is sufficient to protect the cushion from wear and tear in use and yet provide a space between each of the sections such as 34 which makes a practical road gripping means to prevent the tire from slipping or skidding on the road in use.

My cushion is of a very flexible and resilient nature, yet is provided with sufficient rigidity and stiffening so as to accomplish all of the requirements for a casing cushion. It does not require pneumatic means to keep it inflated and thus is very desirable, taking the place of the inflated tubes which are ordinarily used and yet providing a cushion which will absorb the shock of the road to such an extent as to be almost equivalent to the pneumatic cushions. It is of great importance to provide my cushion with means for stiffening and increasing the rigidity at the base 11 and my cushion engaging rings 23 fully accomplish this result, yet without impairing the resiliency of the cushion above the base where it is most desired.

In accordance with the patent statutes I have described the principles of operation of my invention, together with the best apparatus thereof, but I desire to have it understood that this is only illustrative and that the invention can be carried out by other means and applied to uses other than those above set forth within the scope of the following claims.

I claim:

1. A tire cushion including an annular portion of pliable material, annular air passageways in said cushion, integral supporting webs spaced in said air passageways, said cushion being provided with annular slits having the sides thereof normally spaced extending from the outside of said cushion into said air passageways and means disposed in said slits to maintain the sides thereof spaced.

2. A tire cushion for a tire casing including a member having an outer surface to conform to the shape of a tire casing, a central rib-like member extending centrally in said cushion, a base for supporting said central rib-like member, a series of spaced webs formed in said cushion spaced apart in a manner to form openings and said cushion being provided with slits having the sides thereof normally spaced extending from the outside of said casing into said openings to form a cushion wherein the core used in making the same can be readily removed after the cushion is moulded into the desired shape, and means disposed in said slits to maintain the sides thereof spaced.

3. A cushion for automobile tire casings adapted to fit within a casing, having a shape to conform with the inner cross section of the casing, a series of air passageways formed in said cushion and a pair of reinforcing rings embedded within said cushion at the base thereof in a manner to form a cushion and casing support with the rigidity at the base and the point of attachment of the casing.

4. A cushion formed of resilient material adapted to be supported within a casing, a pair of reinforcing ribs formed of metal removably held within the base portion of said cushion, air spaces formed in said cushion, a central rib extending longitudinally through said cushion and separating said air spaces, radial webs spaced apart in said air spaces and recesses formed under said webs in a manner to limit the resiliency of the cushion radially through the same and adapted to support and reinforce the cushion under heavy strain.

5. A cushion including, a resilient member having a longitudinally extending central reinforcing rib, air spaces formed in said cushion, reinforcing radially disposed webs separating said air spaces to equally space the same apart about said cushion, longitudinal slits formed in said cushion on either side thereof, receiving reinforcing rings which are held embedded in the base of said cushion.

6. A cushion adapted to be inserted within a casing, said cushion including a member formed of resilient material having spaces formed therein, webs for separating said spaces from each other, slits common to all of said spaces on either side of said cushion and reinforcing members positioned within said slits to reinforce the base of said cushion when in use.

7. A cushion including, a member formed of resilient material, pairs of open spaces formed in said resilient material, a central reinforcing rib separating said pairs of open spaces and slits common to all of said open spaces receiving reinforcing rings in a manner to form a reinforcement at the base of said cushion and the point of attachment to the rim of said casing members.

8. A tire cushion including, a member formed of resilient material, open spaces formed in said member, transverse and longitudinal webs separating said open spaces from each other and forming reinforcing webs in said cushion, spaces formed under the transverse webs to permit the cushion to flex freely a limited amount when held within a tire casing and said cushion having slits to communicate with all of said spaces in said cushion.

9. A tire cushion including, a member adapted to fill a tire casing to form a resilient supporting means therein, said member having a cross sectional shape similar to the inner part of said casing, a series of air pockets formed in said cushion, said cushion being provided with slits having the sides thereof normally spaced extending from the sides of said cushion and communicating with all of said air pockets, and a base portion formed centrally between said slits in a manner to form a supporting means for the center of said cushion and receiving the free ends of the sides of the cushion which fit into said slits, and means disposed in said slits to maintain the sides thereof spaced.

10. A tire cushion including, a member formed of resilient material, radial webs formed in said cushion and spaced apart in a manner to form air pockets throughout the entire circumference of said cushion, flaps formed on the side walls of said cushion, a base portion formed in said cushion, said base portion having recesses formed therein adapted to receive the free ends of said flaps in a manner to form slits having the sides thereof normally spaced on either side of said cushion common to all of said air spaces formed between said webs, and means disposed in said slits to maintain the sides thereof spaced.

11. A tire cushion adapted to be inserted within a tire casing in a manner to form a cushion support for the same, including a body portion formed of resilient material, a central web extending longitudinally through said cushion, said cushion having slits with normally spaced sides, air pockets formed on either side of said web, transversely disposed webs extending from the walls to the central web formed in said cushion, said cushion having open spaces beneath said transversely disposed webs and means disposed in said slits to maintain the sides thereof spaced.

12. A casing cushion formed of resilient material, including a body portion, a base portion formed on said cushion, a rib extending centrally through said cushion from the base to the upper portion which supports the tread of the casing, a series of openings formed in said cushion on either side of said central rib member and flaps formed projecting from the side walls of said cushion and fitting into recesses formed in the sides of the base of said cushion and reinforcing rings fitting in the recesses and covered by said flaps.

GEORGE H. YOUNG.